US007971554B1

(12) United States Patent
Diaz

(10) Patent No.: US 7,971,554 B1
(45) Date of Patent: Jul. 5, 2011

(54) BIRD FEEDER AND ASSOCIATED METHOD

(76) Inventor: Irma Diaz, San Diego, CA (US)

( * ) Notice: Subject to any disclaimer, the term of this patent is extended or adjusted under 35 U.S.C. 154(b) by 246 days.

(21) Appl. No.: 12/383,550

(22) Filed: Mar. 25, 2009

Related U.S. Application Data

(60) Provisional application No. 61/070,628, filed on Mar. 25, 2008.

(51) Int. Cl.
*A01K 1/08* (2006.01)
(52) U.S. Cl. .................. 119/429; 119/52.2; 119/57.8
(58) Field of Classification Search ............... 119/57.91, 119/428–435, 482, 57.9, 57.8, 52.3, 52.2, 119/464, 463, 459, 452, 453, 461, 483, 496, 119/472, 473, 474, 475; D30/110, 111, 124, D30/126, 125; 220/254.6, 254.1, 254.3, 220/827, 826, 810, FOR. 192, 819, 818, 817, 220/848
See application file for complete search history.

(56) References Cited

U.S. PATENT DOCUMENTS

| 638,126 | A | * | 11/1899 | Kampfe | 220/504 |
| D163,666 | S | * | 6/1951 | Worden | D30/110 |
| D215,855 | S | * | 11/1969 | Henreid | D30/111 |
| 3,643,631 | A | * | 2/1972 | Wade et al. | 119/434 |
| 3,645,235 | A | * | 2/1972 | Suchla | 119/52.2 |
| 4,104,988 | A | * | 8/1978 | Trutor | 119/57.8 |
| 4,442,793 | A | * | 4/1984 | Overpeck et al. | 119/432 |
| 6,397,779 | B1 | * | 6/2002 | Bonne | 119/51.01 |
| 7,036,458 | B1 | * | 5/2006 | Stornant | 119/496 |

* cited by examiner

*Primary Examiner* — Andrea M Valenti

(57) ABSTRACT

A bird feeder preferably includes a top lid, a central housing pivotally coupled to the top lid, a bottom base pivotally coupled to the central, and a mechanism for automatically articulating a first one of the top lid and the bottom base along a first arcuate path while manually articulating a second one of the top lid and the bottom base along a second arcuate path. In this manner, the central housing remains at a statically fixed position while the top lid and the bottom base articulate between corresponding open and closed positions. In one embodiment, the articulating mechanism may include an actuating shaft contiguously abutted against a gear for ensuring the bottom base simultaneously rotates with the top lid during opening and closing positions respectively.

17 Claims, 10 Drawing Sheets

BIRD FEEDER AND ASSOCIATED METHOD

CROSS REFERENCE TO RELATED APPLICATIONS

This application claims the benefit of U.S. Provisional Application No. 61/070,628, filed Mar. 25, 2008, the entire disclosures of which are incorporated herein by reference.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to bird feeders and, more particularly, to a bird feeder employing a hinged roof and base for diverting snow and permitting food to drop to a ground level, in order to feed snow birds as well as small bird that are ground feeders, respectively.

2. Prior Art

Bird feeders are well known and comprise a myriad of forms. In its simplest form, a bird feeder may be a raised horizontal surface on which food is placed. In a more advanced form, a roof may be provided over the horizontal surface. In other cases, especially when loose seed is the food, the food may be placed in a vertical cylinder having an opening at the bottom for the seed to exit.

While each of the known bird feeders is satisfactory in one or more respects, many suffer from the disadvantage that the food is not adequately protected from rain and snow. Additionally, most suffer from the disadvantage that the food may be blown away by wind. The latter disadvantage is true even with the cylindrical type of bird feeder, as the seed can be blown away after it exits the cylinder. Bird feeders are preferably constructed with open access so that birds can fly in and out of the bird feeder without restriction and to provide visual observation of the birds while feeding. As a result of the open design, bird feeders permit snow and rain to enter the bird feeder thus causing deterioration of certain bird feed, in particular bird seed.

The Smith U.S. Pat. No. 5,189,984 discloses a bird feeder enclosure for sheltering a standard bird feeder. The enclosure has only one open side wall and the bird feeder is suspended within the enclosure. Smith thus provides for an inner roof and an outer enclosure, but does not show a hinged roof or cover for covering feeding stations and does not show a silo feeder with a hinged cover.

The Latham U.S. Pat. No. 4,523,546 is directed to squirrel-proofing bird feeders by means of a flexible covering sheet which is mounted above a standard bird feeder. The sheet functions as a squirrel guard to prevent access to the feeder but by virtue of its position above the feeder, the flexible covering could be considered to function as a primary roof. However, Latham does not disclose a integral feeding station with a hinged roof or a bird feeder with side walls.

Collins, U.S. Pat. No. 5,471,951, discloses an electrified feeder with a single hinged roof member, covering the seed supply.

The Greenough U.S. Pat. No. 2,705,938 teaches a silo or tubular feeder having a cylindrical body with apertures at the base for access to the seed supply. However, neither Greenough nor Collins discloses a primary roof member or side walls for use with silos for supplying bird seed to a position of accessibility.

Accordingly, a need remains for a bird feeder in order to overcome the above-noted shortcomings. The present invention satisfies such a need by providing a device that is convenient and easy to use, is durable yet lightweight in design, is versatile in its applications, and provides the ability to divert snow away from the food as well as the ability to dispense bird food to a ground level.

BRIEF SUMMARY OF THE INVENTION

In view of the foregoing background, it is therefore an object of the present invention to provide a bird feeder for feeding small birds as well as protecting bird food from snow during inclement weather conditions. These and other objects, features, and advantages of the invention are provided by a bird feeder that preferably includes a top lid, a central housing pivotally coupled to the top lid and situated therebelow. The bird feeder may further include a bottom base pivotally coupled to the central housing and situated therebelow such that the central housing is intercalated between the top lid and the bottom base. The bird feeder may further include a mechanism is also provided for automatically articulating a first one of the top lid and the bottom base along a first arcuate path while manually articulating a second one of the top lid and the bottom base along a second arcuate path. In this manner, the central housing remains at a statically fixed position while the top lid and the bottom base articulate between corresponding open and closed positions.

Notably, the top lid is at the open position while the bottom base is at the open position such that snow and debris are caused to exit through the central housing. Likewise, the top lid is at the closed position while the bottom base is at the closed position such that snow and debris are prohibited from entering the central housing.

In one embodiment, the top lid has first and second planar faces defining an apex of the top lid. Such first and second planar faces are configured in such a manner that snow and debris are discharged along sloping paths diverging downwardly and way from an apex of the top lid. Further, each of the first and second planar surfaces has a topmost linear edge extending along the apex. Such topmost linear edges remain statically connected to each other while the top lid is biased between the open and closed positions.

In one embodiment, the bottom base may include a canister monolithically formed therewith. Such a canister may be arranged in such a manner that the canister is completely disposed within the central housing while the bottom base is at the closed position. The canister may be pivotally displaced exterior of the central housing when the bottom base is pivotally displaced to the open position.

The bottom base may include a plurality of apertures formed therein. Such apertures are in fluid communication with a bottom edge of the canister such that bird food is caused to fall through the bottom base and onto a ground surface. Further, the canister may be provided with a plurality of longitudinal flanges laterally extending away therefrom for receiving and thereby prohibiting bird food from spilling out of the canister when the canister is articulated exterior of the central housing.

Such first and second arcuate paths are preferably defined about first and second fulcrum axes respectively. In this manner, the first and second fulcrum axes may be vertically aligned and registered parallel to each other along one face of the central housing. Such first and second arcuate paths extend at least 90 degrees away from open top and bottom ends of the central housing respectively.

The present invention further includes a method of utilizing a bird feeder for feeding small birds as well as protecting bird food from snow during inclement weather conditions. Such a method preferably includes the chronological steps of: providing a top lid; providing and situating a central housing below the top lid by pivotally coupling the central housing to the top lid; providing and intercalating a central housing between the top lid and the bottom base by situating the bottom base below the central housing and further by pivotally coupling the bottom base to the central housing; automatically articulating a first one of the top lid and the bottom base along a first arcuate path while manually articulating a second one of the top lid and the bottom base along a second arcuate path; and maintaining the central housing at a statically fixed position while articulating the top lid and the bottom base between corresponding open and closed positions.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

Figure 1:
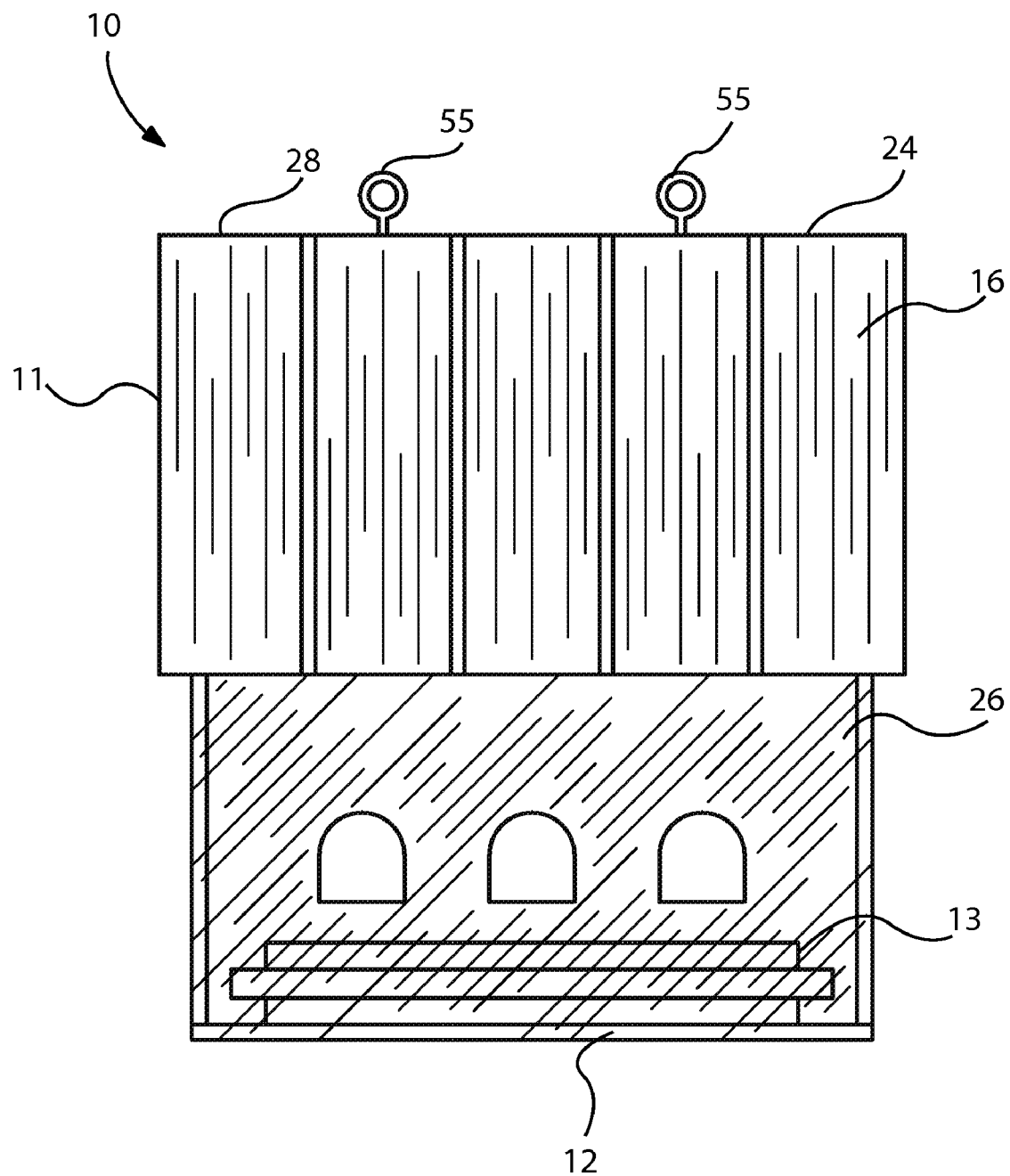
FIG. 1 is a left side elevational view showing a bird feeder, in accordance with the present invention.
Figure 2:
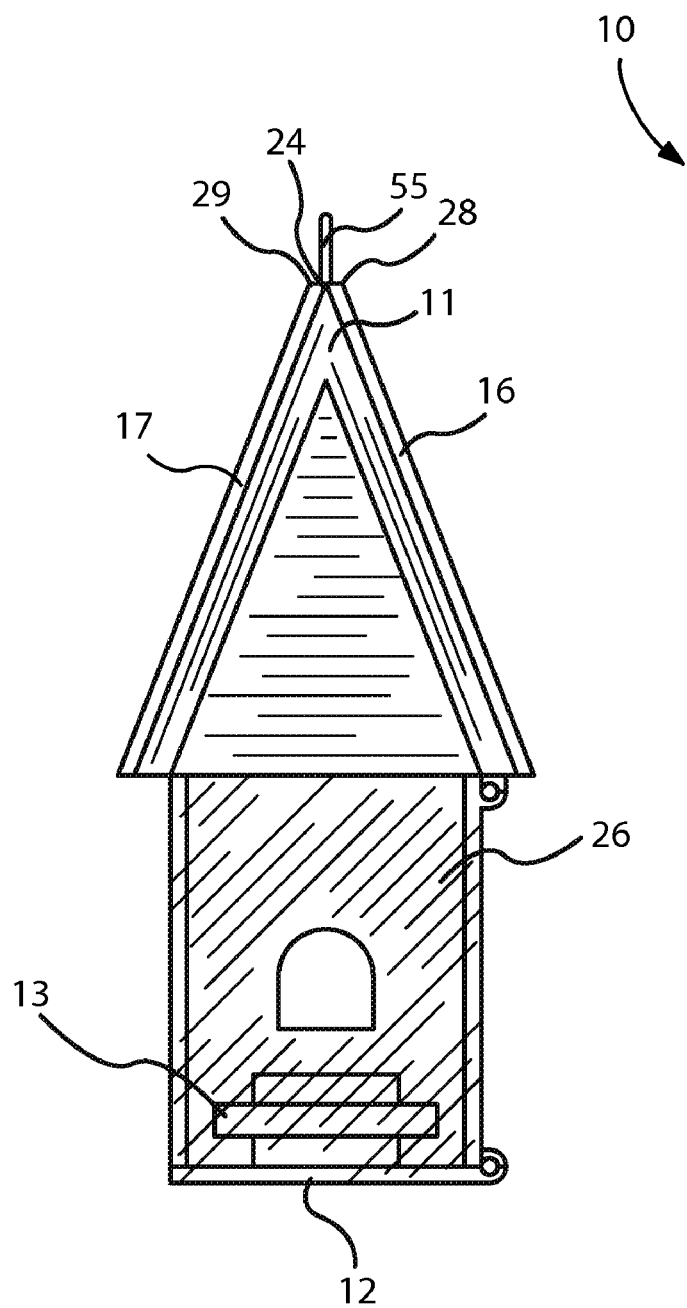
FIG. 2 is a front elevational view of the bird feeder shown in FIG. 1.
Figure 3:
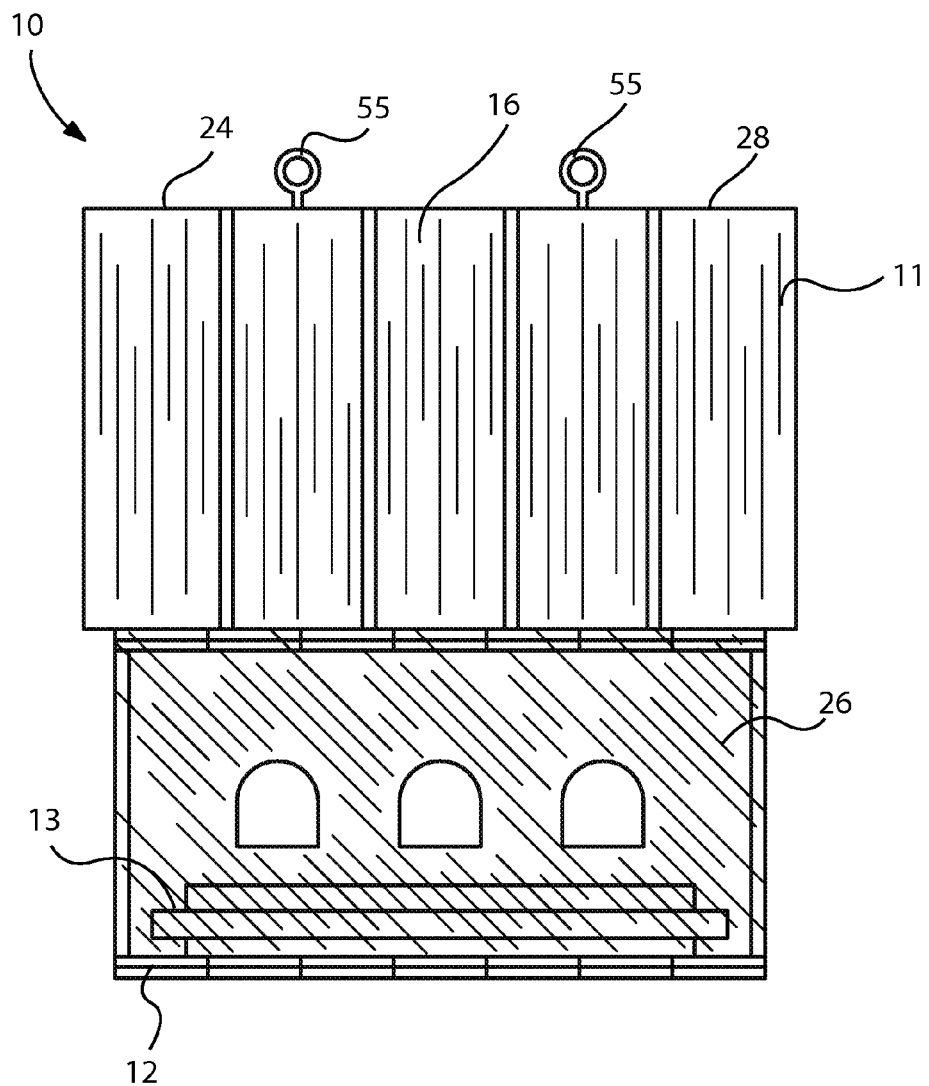
FIG. 3 is a right side elevational view the bird feeder shown in FIG. 1.
Figure 4:
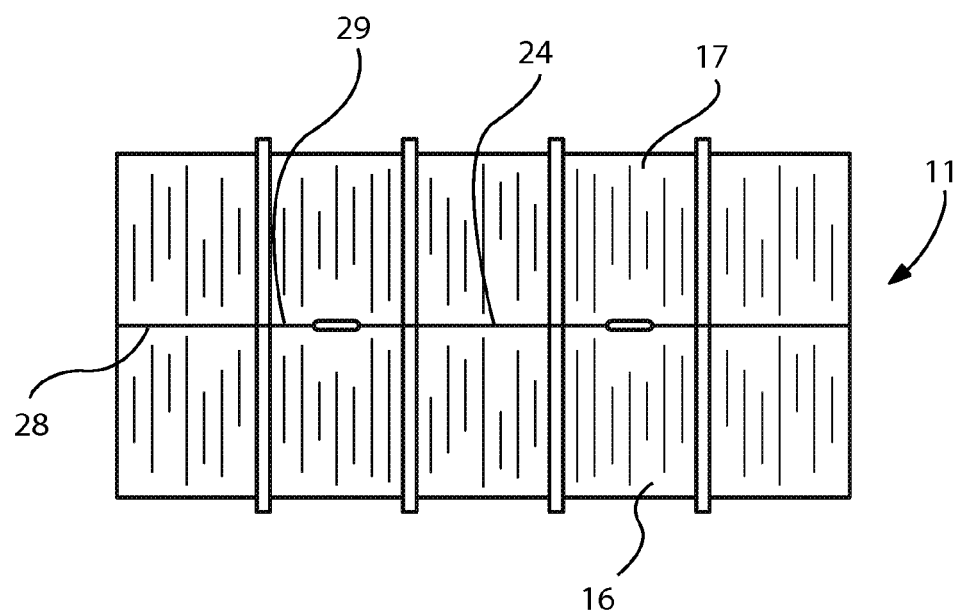
FIG. 4 is a top plan view of the bird feeder shown in FIG. 1.

Those skilled in the art will appreciate that the figures are not intended to be drawn to any particular scale; nor are the figures intended to illustrate every embodiment of the invention. The invention is not limited to the exemplary embodiments depicted in the figures or the shapes, relative sizes or proportions shown in the figures.

DETAILED DESCRIPTION OF THE INVENTION

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The apparatus of this invention is referred to generally in FIGS. 1-10 by the reference numeral 10 and is intended to provide a bird feeder 10 for use during snow conditions. It should be understood that the bird feeder 10 may be used to feed many different types of birds and should not be limited to feeding any particular bird.

The bird feeder 10 is provided for feeding small birds as well as protecting bird food from snow during inclement weather conditions. The bird feeder 10 preferably includes a top lid 11, a central housing 26 pivotally coupled to the top lid 11 and situated therebelow. The bird feeder 10 may further include a bottom base 12 pivotally coupled to the central housing 26 and situated therebelow such that the central housing 26 is intercalated between the top lid 11 and the bottom base 12. Such a configuration provides the unpredicted and unexpected result of permitting continuous air flow along an axial path defined through top and bottom open ends of said central housing.

Figure 8:
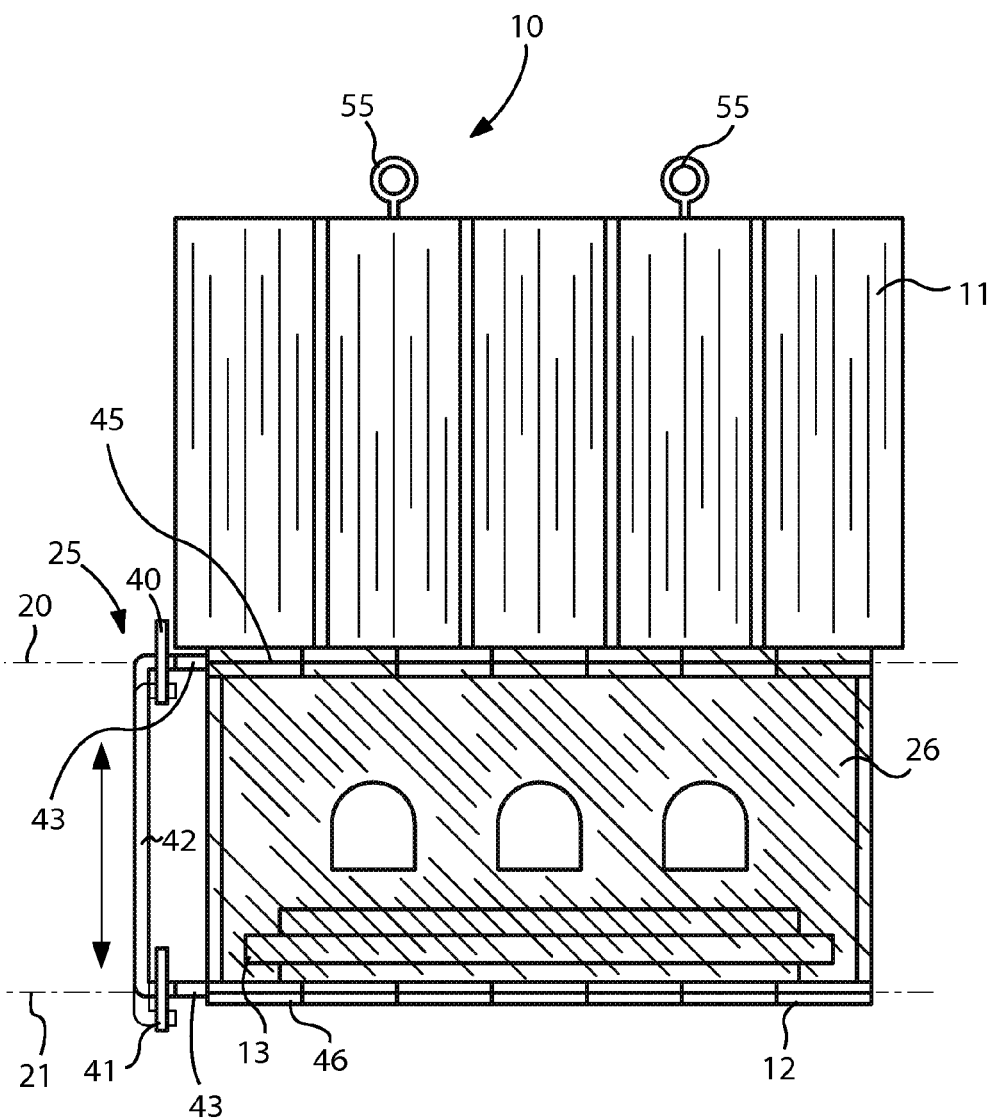
FIG. 8 is a side elevational view showing the articulating mechanism attached to the top lid and bottom base.
Figure 9:
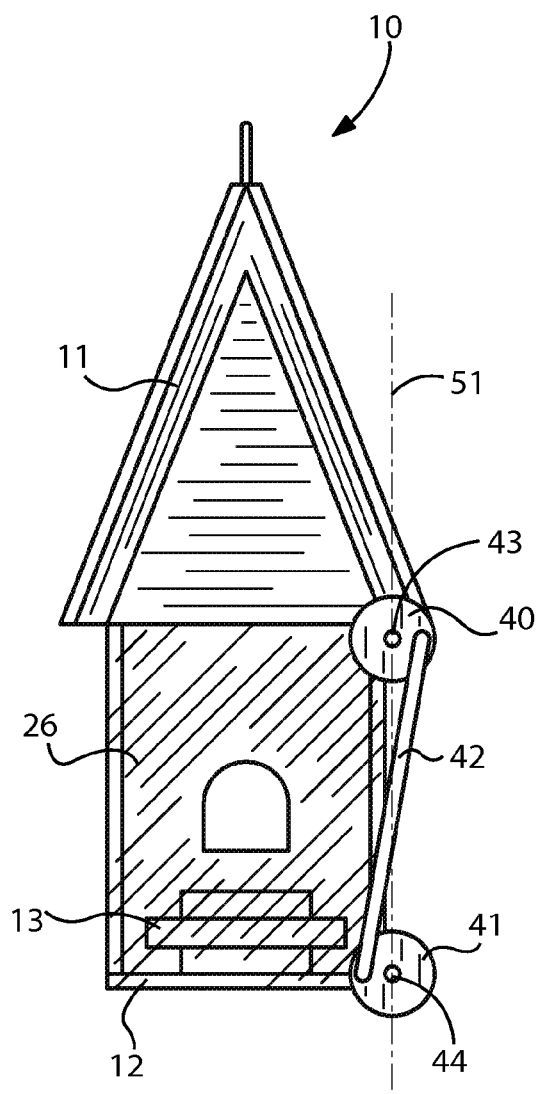
FIG. 9 is a front elevational view showing the actuating lever at an angularly offset position.
Figure 10:
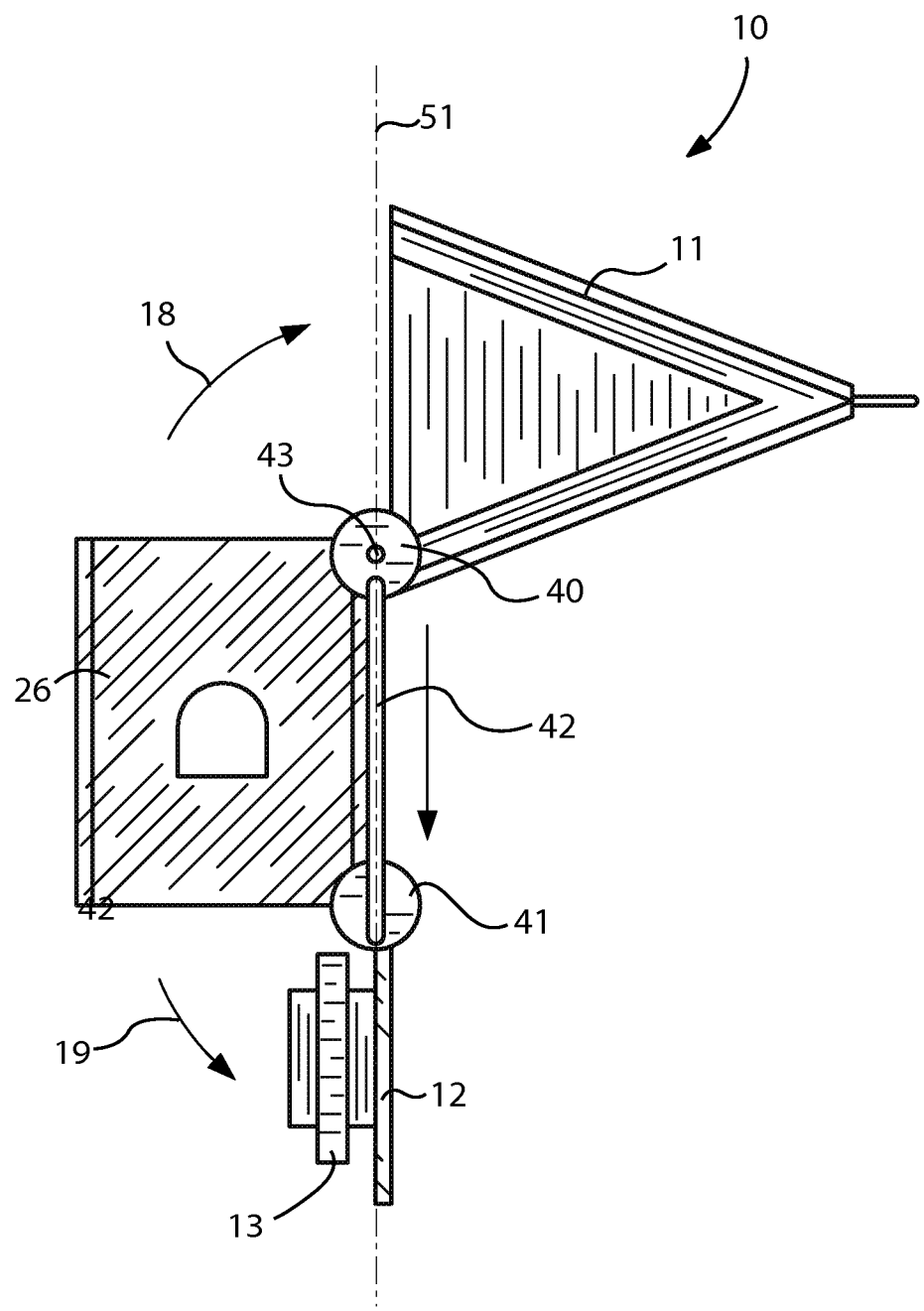
FIG. 10 is a side elevational view showing the actuating lever at a vertically aligned position.

As perhaps best shown in FIGS. 8-10, the bird feeder 10 may further include a mechanism 25 for automatically articulating a first one of the top lid 11 and the bottom base 12 along a first arcuate path 18 while manually articulating a second one of the top lid 11 and the bottom base 12 along a second arcuate path 19. In this manner, the central housing 26 remains at a statically fixed position while the top lid 11 and the bottom base 12 articulate between corresponding open and closed positions. Such a mechanism provides the unpredicted and unexpected result of ensuring that snow is not permitted to accumulate within the central housing 26 during cleaning procedures.

Notably, the top lid 11 is at the open position while the bottom base 12 is at the open position such that snow and debris are caused to exit through the central housing 26. Likewise, the top lid 11 is at the closed position while the bottom base 12 is at the closed position such that snow and debris are prohibited from entering the central housing 26. Such a configuration provides the unpredicted and unexpected result of ensuring snow and debris are effectively cleansed from the central housing 26 when the top lid 11 is opened.

In one embodiment, a plurality of eyelets 55 may be attached to an apex of the top lid 11, for assisting a user to hang the birder feeder 10 from a support surface. The top lid 11 may also have first and second planar faces 16, 17 defining an apex 24 of the top lid 11. Such first and second planar faces 16, 17 are configured in such a manner that snow and debris are discharged along sloping paths diverging downwardly and away from apex 24 of the top lid 11.

Further, each of the first and second planar surfaces 16, 17 has a topmost linear edge 28, 29 extending along the apex 24. Such topmost linear edges 28, 29 remain statically connected to each other while the top lid 11 is biased between the open and closed positions. Such a configuration provides the unpredicted and unexpected result of effectively diverting snow and debris away from the apertures 14 formed in the bottom base 12.

In one embodiment, the bottom base 12 may include a canister 13 monolithically formed therewith. Such a canister 13 may be arranged in such a manner that the canister 13 is completely disposed within the central housing 26 while the bottom base 12 is at the closed position. The canister 13 may be pivotally displaced exterior of the central housing 26 when the bottom base 12 is pivotally displaced to the open position. Such a configuration provides the unpredicted and unexpected result of ensuring that snow does not soil or contaminate the bird food contained within the canister 13.

Figure 5:
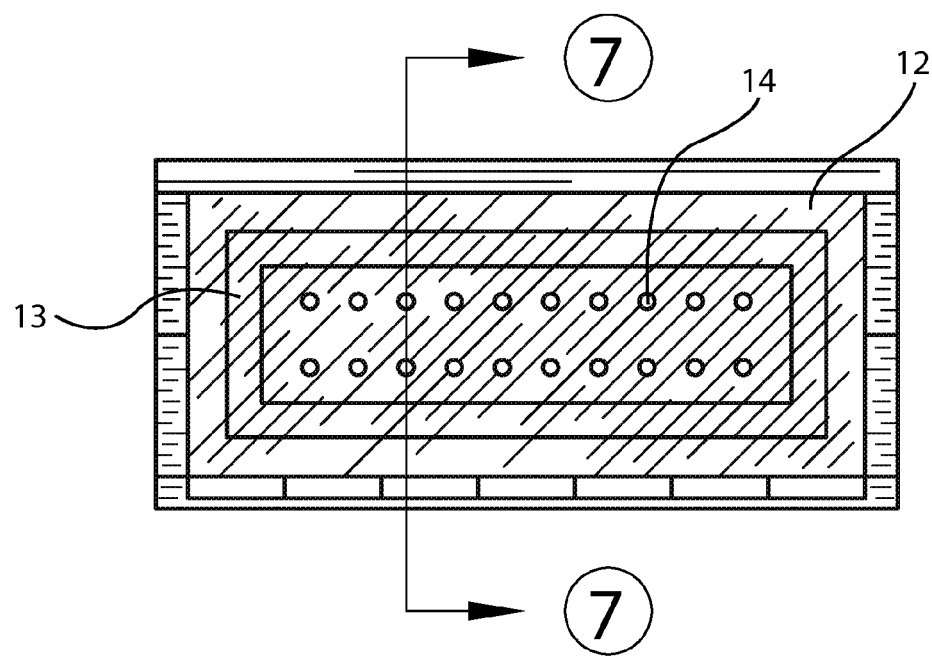
FIG. 5 is a bottom plan view of the bird feeder shown in FIG. 1.
Figure 6:
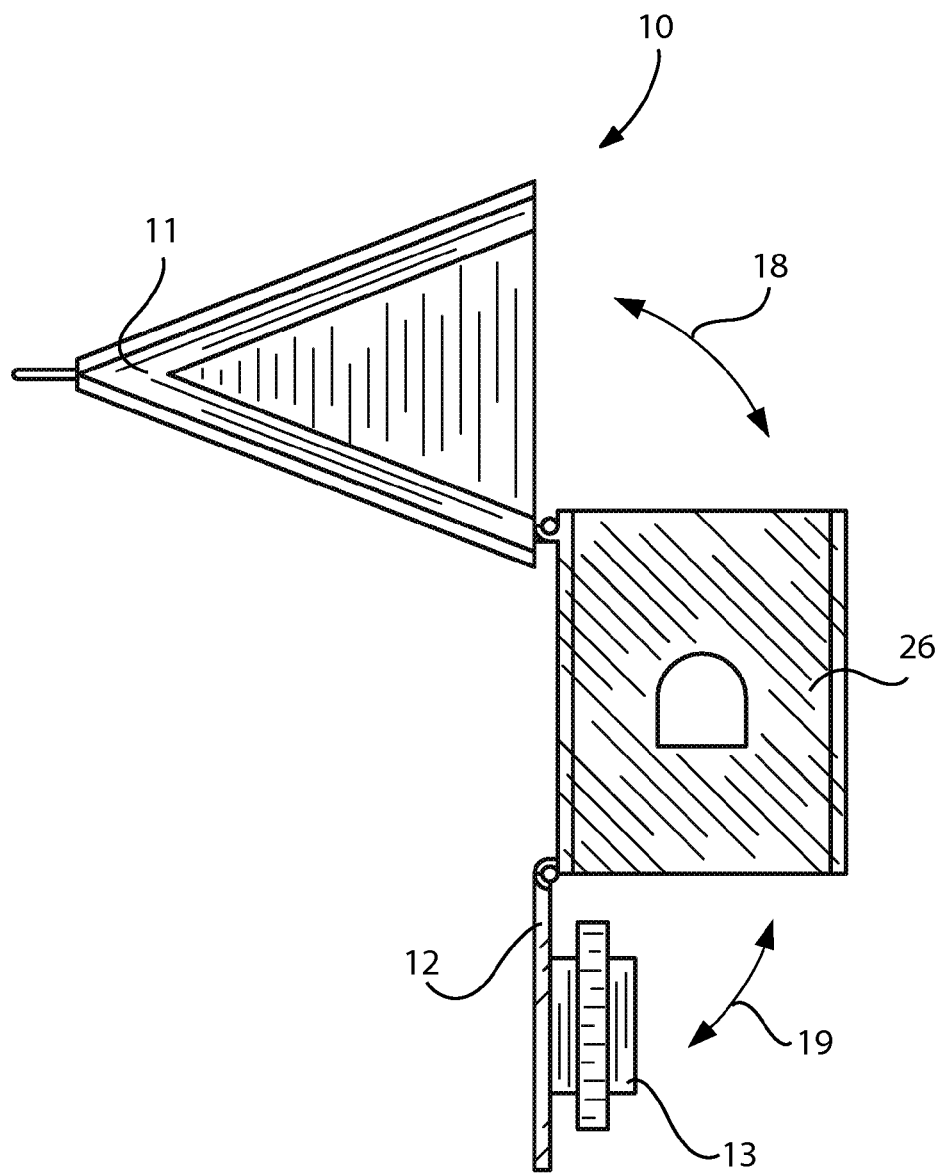
FIG. 6 is a side elevational view showing the top lid and the bottom base simultaneously articulated to an open position.
Figure 7:
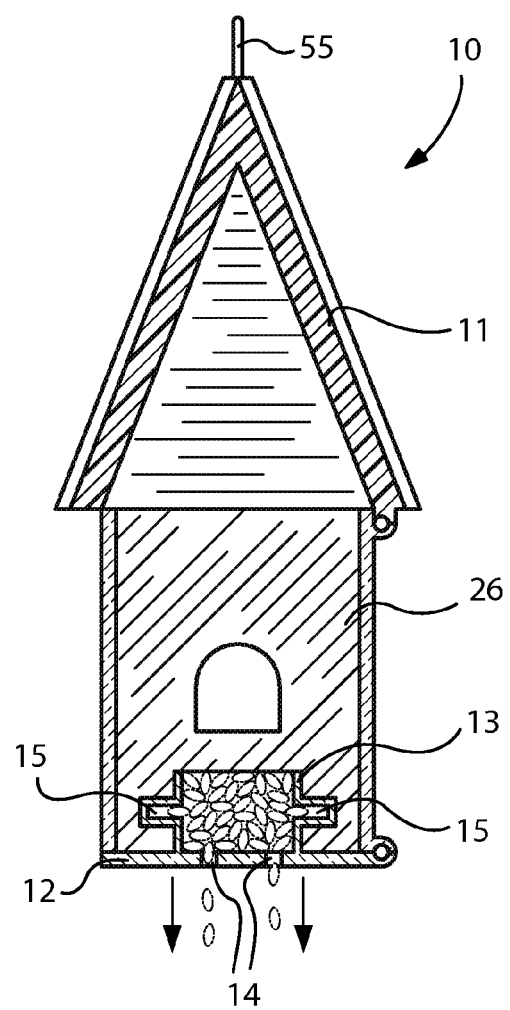
FIG. 7 is a cross-sectional view showing the bird feed falling through the apertures.

As perhaps best shown in FIGS. 5-7, the bottom base 12 may include a plurality of apertures 14 formed therein. Such apertures 14 are in fluid communication with a bottom edge of the canister 13 such that bird food is caused to fall through the bottom base 12 and onto a ground surface. Further, the canister 13 may be provided with a plurality of longitudinal flanges 15 laterally extending away therefrom for receiving and thereby prohibiting bird food from spilling out of the canister 13 when the canister 13 is articulated exterior of the central housing 26. As perhaps best shown in FIG. 7, the apertures 14 are suitably sized and shaped for permitting the bird food to selectively drop to the ground surface.

As perhaps best shown in FIGS. 6, 8 and 10, such first and second arcuate paths 18, 19 are preferably defined about first and second fulcrum axes 20, 21, respectively. In this manner, the first and second fulcrum axes 20, 21 may be vertically aligned and registered parallel to each other along one face of the central housing 26. Such first and second arcuate paths 18, 19 extend at least 90 degrees away from open top and bottom ends of the central housing 26, respectively.

Now referring to FIGS. 8-10, mechanism 25 is shown as including first and second rotary dials 40, 41 pivotally coupled to the top lid 11 and bottom base 12, respectively. An actuating lever 42 has opposed ends directly anchored to the first and second rotary dials 40, 41 respectively. First and second rectilinear pivot rods 43, 44 are passed through a series of hinges 45, 46, respectively. In particular, hinges 45 are operably mated to the top lid 11 and central housing 26 while hinges 46 are operably mated to the bottom base 12 and central housing 26, respectively. Pivot rods 43, 44 are linearly intercalated through hinges 45, 46 and configured in such a manner so that the top lid 11 and bottom base 12 are articulated as the rotary dials 40, 41 are rotated along a corresponding rotational path.

Notably, the actuating lever 42 is oppositely offset at diametrically opposed regions of the rotary dials 40, 41. In this manner, when the top lid 11 and bottom base 12 at closed positions, the top and bottom ends of actuating lever 42 are angularly offset from a vertical axis 51 centrally aligned between the rotary dials 40, 41. However, when the top lid 11 and bottom base 12 at open positions, the top and bottom ends of actuating lever 42 are vertically aligned and registered parallel to the vertical axis.

Such a configuration provides the unpredictable and unexpected advantage of causing the second rotary dial 41 to rotate along a clockwise direction while the first rotary dial 40 rotates along a counter clockwise direction; and visa versa. Such opposite rotational movements ensure each of top lid 11 and bottom base 12 is simultaneously biased between open and closed positions for providing the advantageous benefits listed hereinabove.

The present invention 10 further includes a method of utilizing a bird feeder 10 for feeding small birds as well as protecting bird food from snow during inclement weather conditions. Such a method preferably includes the chronological steps of: providing a top lid 11; providing and situating a central housing 26 below the top lid 11 by pivotally coupling the central housing 26 to the top lid 11; providing and intercalating the central housing 26 between the top lid 11 and the bottom base 12 by situating the bottom base 12 below the central housing 26 and further by pivotally coupling the bottom base 12 to the central housing 26; automatically articulating a first one of the top lid 11 and the bottom base 12 along a first arcuate path 18 while manually articulating a second one of the top lid 11 and the bottom base 12 along a second arcuate path 19; and maintaining the central housing 26 at a statically fixed position while articulating the top lid 11 and the bottom base 12 between corresponding open and closed positions.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A bird feeder for feeding small birds as well as protecting bird food from snow during inclement weather conditions, said bird feeder comprising:
   a top lid;
   a central housing pivotally coupled to said top lid and being situated therebelow;
   a bottom base pivotally coupled to said central housing and being situated therebelow such that said central housing is intercalated between said top lid and said bottom base; and
   means for articulating a first one of said top lid and said bottom base along a first arcuate path while automatically and simultaneously articulating a second one of said top lid and said bottom base along a second arcuate path.

2. The bird feeder of claim 1, wherein said top lid is at an open position while said bottom base is at an open position such that snow and debris are caused to exit through said central housing.

3. The bird feeder of claim 2, wherein said top lid is at a closed position while said bottom base is at a closed position such that snow and debris are prohibited from entering said central housing.

4. The bird feeder of claim 3, wherein said top lid has first and second planar faces defining an apex of said top lid, said first and second planar faces being configured in such a manner that snow and debris are discharged along sloping paths diverging downwardly and away from an apex of said top lid.

5. The bird feeder of claim 4, wherein each of said first and second planar surfaces has a topmost linear edge extending along said apex, said topmost linear edges remaining statically connected to each other while said top lid is biased between the open and closed positions.

6. The bird feeder of claim 5, wherein said bottom base comprises:
  a canister monolithically formed therewith, said canister being arranged in such a manner that said canister is completely disposed within said central housing while said bottom base is at the closed position, said canister being pivotally displaced exterior of said central housing when said bottom base is pivotally displaced to the open position; and
  a plurality of apertures in fluid communication with a bottom edge of said canister such that bird food is caused to fall through said bottom base and onto a ground surface, said canister being provided with a plurality of longitudinal flanges laterally extending away therefrom for receiving and thereby prohibiting bird food from spilling out of said canister when said canister is articulated exterior of said central housing.

7. The bird feeder of claim 6, wherein said first and second arcuate paths are defined about first and second fulcrum axes respectively, said first and second fulcrum axes being vertically aligned and registered parallel to each other along one face of said central housing.

8. The bird feeder of claim 6, wherein said first and second arcuate paths extend at least 90 degrees away from open top and bottom ends of said central housing respectively.

9. A bird feeder for feeding small birds as well as protecting bird food from snow during inclement weather conditions, said bird feeder comprising:
  a top lid;
  a central housing pivotally coupled to said top lid and being situated therebelow;
  a bottom base pivotally coupled to said central housing and being situated therebelow such that said central housing is intercalated between said top lid and said bottom base; and
  means for articulating a first one of said top lid and said bottom base along a first arcuate path while automatically and simultaneously articulating a second one of said top lid and said bottom base along a second arcuate path;
  wherein said central housing remains at a statically fixed position while said top lid and said bottom base articulate between corresponding open and closed positions.

10. The bird feeder of claim 9, wherein said top lid is at the open position while said bottom base is at the open position such that snow and debris are caused to exit through said central housing.

11. The bird feeder of claim 10, wherein said top lid is at the closed position while said bottom base is at the closed position such that snow and debris are prohibited from entering said central housing.

12. The bird feeder of claim 11, wherein said top lid has first and second planar faces defining an apex of said top lid, said first and second planar faces being configured in such a manner that snow and debris are discharged along sloping paths diverging downwardly and away from an apex of said top lid.

13. The bird feeder of claim 12, wherein each of said first and second planar surfaces has a topmost linear edge extending along said apex, said topmost linear edges remaining statically connected to each other while said top lid is biased between the open and closed positions.

14. The bird feeder of claim 13, wherein said bottom base comprises:
  a canister monolithically formed therewith, said canister being arranged in such a manner that said canister is completely disposed within said central housing while said bottom base is at the closed position, said canister being pivotally displaced exterior of said central housing when said bottom base is pivotally displaced to the open position; and
  a plurality of apertures in fluid communication with a bottom edge of said canister such that bird food is caused to fall through said bottom base and onto a ground surface, said canister being provided with a plurality of longitudinal flanges laterally extending away therefrom for receiving and thereby prohibiting bird food from spilling out of said canister when said canister is articulated exterior of said central housing.

15. The bird feeder of claim 14, wherein said first and second arcuate paths are defined about first and second fulcrum axes respectively, said first and second fulcrum axes being vertically aligned and registered parallel to each other along one face of said central housing.

16. The bird feeder of claim 14, wherein said first and second arcuate paths extend at least 90 degrees away from open top and bottom ends of said central housing respectively.

17. A method of utilizing a bird feeder for feeding small birds as well as protecting bird food from snow during inclement weather conditions, said method comprising the chronological steps of:
  providing a top lid;
  providing and situating a central housing below said top lid by pivotally coupling said central housing to said top lid;
  intercalating said central housing between said top lid and bottom base by situating said bottom base below said central housing and further by pivotally coupling said bottom base to said central housing;
  initiating a means for automatically articulating a first one of said top lid and said bottom base along a first arcuate path while automatically and simultaneously articulating a second one of said top lid and said bottom base along a second arcuate path; and
  maintaining said central housing at a statically fixed position while articulating said top lid and said bottom base between corresponding open and closed positions.

\* \* \* \* \*